United States Patent
Gebhardt et al.

(10) Patent No.: US 9,323,647 B2
(45) Date of Patent: Apr. 26, 2016

(54) REQUEST-BASED ACTIVATION OF DEBUGGING AND TRACING

(75) Inventors: Boris Gebhardt, Ketsch (DE);
Christoph Stoeck, Eppelheim (DE);
Erik Sodtke, Ubstadt-Weiher (DE)

(73) Assignee: SAP SE, Walldorf (DE)

( * ) Notice: Subject to any disclaimer, the term of this patent is extended or adjusted under 35 U.S.C. 154(b) by 1277 days.

(21) Appl. No.: 12/368,716

(22) Filed: Feb. 10, 2009

(65) Prior Publication Data

US 2010/0205583 A1    Aug. 12, 2010

(51) Int. Cl.
*G06F 11/00* (2006.01)
*G06F 11/36* (2006.01)

(52) U.S. Cl.
CPC .................................. *G06F 11/366* (2013.01)

(58) Field of Classification Search
CPC ........................... G06F 11/366; G06F 11/3664
USPC ............ 714/34, 35, 38.13; 717/125, 127, 129
See application file for complete search history.

(56) References Cited

U.S. PATENT DOCUMENTS

| | | | |
|---|---|---|---|
| 7,194,664 B1 * | 3/2007 | Fung et al. | 714/45 |
| 2004/0168155 A1 * | 8/2004 | O'Farrell et al. | 717/129 |
| 2007/0168997 A1 * | 7/2007 | Tran | 717/129 |
| 2007/0266149 A1 * | 11/2007 | Cobb et al. | 709/224 |
| 2008/0155330 A1 * | 6/2008 | Van Wyk et al. | 714/35 |

* cited by examiner

*Primary Examiner* — Joseph Kudirka
(74) *Attorney, Agent, or Firm* — Schwegman Lundberg & Woessner, P.A.

(57) ABSTRACT

Apparatus, systems, and methods for troubleshooting a software service are disclosed that operate to execute the software service on a computing platform to provide a software execution; receive a request at the software service, the request including a client session identifier; identify a troubleshooting point in the software execution based on the client session identifier; and perform a troubleshooting action when the troubleshooting point is detected during the software execution. Additional apparatus, systems, and methods are disclosed.

20 Claims, 8 Drawing Sheets

REQUEST-BASED ACTIVATION OF DEBUGGING AND TRACING

BACKGROUND

A workflow process executed by a user may include a number of logical activities. Each logical activity may be handled by a separate software program, computer platform, or even service provider. As systems become more distributed, diversified, and complex, troubleshooting and debugging an error that occurs during runtime is increasingly difficult.

BRIEF DESCRIPTION OF THE DRAWINGS

Some embodiments are illustrated by way of example, and not limitation, in the figures of the accompanying drawings in which.

DETAILED DESCRIPTION

A "workflow" includes one or more activities or tasks that are executed in a manner provided by a workflow definition. A "workflow definition" operates to define data flow and control flow between each of the activities in a chain of workflow activities. A "workflow activity" is a unit of work, which may be compartmentalized as an interchangeable or transportable service, such as in a service-oriented architecture.

A "workflow participant" includes any user or agent of a user of a workflow management system. This is taken to include end-users, administrative users, support users, and developers. A workflow participant may have a role, and that role may be used to modify, enhance, or restrict workflows available to the particular workflow participant.

A "workflow management system" is a computerized system that provides one or more services to a workflow participant, where the services are designed to accomplish one or more workflow activities based on a workflow. A workflow management system may be provided on a homogenous platform (e.g., from a single or common service provider) or on a heterogeneous platform (e.g., from two or more service providers, or using two or more programming platforms).

"Electronic content" includes any digital data that may be presented to a workflow participant (e.g., visually or audibly presented), such as an electronic document, page-descriptive electronic content such as a page-descriptive electronic document, media stream, web page, hypertext document, image, digital video or video recording, digital audio or audio recording, an animation, a markup language document, such as for example a document including HyperText Markup Language (HTML) or eXtensible Markup Language (XML), a form having components to be filled in, or data describing the application of a graphical user interface (GUI). Electronic content may comprise a variety of content elements.

A "content element" includes any part or share of electronic content that is defined or discernable as a part or share. For example, a content element may be automatically discerned from a characteristic of the content element itself (e.g., a paragraph of an electronic document or a file format designation) or may be manually defined by a workflow participant (e.g., a user-selected collection of words in an electronic document or a user-selected portion of a digital image). Examples of content elements include portions of a page-descriptive document or other electronic document, such as, for example, pieces of electronic text or other material, such as a group of instructions within the electronic document, dynamic content in the form of portions of media streams such as sections of digital video or frames or sets of frames of digital video or digital audio, dynamic content in the form of segments or frames of animations, electronic forms, form templates, form elements, form data, user interface controls that execute instructions, and various elements presentable or accessible by workflow participants within electronic content, including instances of scripted and non-scripted dynamic content and the like.

Certain applications or processes are described herein as including a number of modules. A "module" is a unit of distinct functionality that can provide information to, and receive information from, other modules. Accordingly, the described modules may be regarded as being communicatively coupled. Modules may also initiate communication with input or output devices and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" may include an identifiable portion of code, data, or computational object, such as a document application, designed to achieve a particular function, operation, processing, or procedure.

A "plug-in" is a runtime application engine that is used to process workflow activities on the client side, apart from a workflow management engine operative on the server side, such as at a server or network.

For the purposes of this document, "troubleshooting" includes actions such as debugging, monitoring, logging, and tracing program code and execution. A "troubleshooting operation" is a process that is executed to assist in troubleshooting. A troubleshooting operation includes a "troubleshooting point" and a "troubleshooting action." Thus, the troubleshooting operation may be expressed as "when <troubleshooting point> is recognized then perform <troubleshooting action>." Although the expression of a debugging operation is described, it is understood that the implementation may vary depending on the choice of design.

A troubleshooting point is the point in time or point during execution that a troubleshooting action is executed. A troubleshooting point may be thought of as a triggering event, where the troubleshooting action is the resulting action taken in response to the triggering event. A troubleshooting point may be expressed in various ways, such as in terms of a software execution state or a software context. For example, the software execution state may be expressed in terms of an execution progress, an execution event, or an execution time. Execution progress may be measured in terms of a source line of code that has been or will be executed. Execution events may include new lines, new procedures, or new layers encountered during a software execution. Execution time may include the time the software has been executing. In addition, a troubleshooting point may be expressed in terms of the software execution context using internal or external variables, stack content, memory content, or other environmental metrics. Also, a troubleshooting point may be expressed as a compound condition (e.g., "when source code 123 of program ALPHA is reached and when variable X is greater than 7"). The use of Boolean expressions or regular expressions (e.g., "when the value of variable Y is 'abc*'," where '*' indicates that the substring "abc*" will match anything beginning with "abc") is also supported in various embodiments.

A troubleshooting action is an action executed at a particular point during software execution (e.g., the troubleshooting point). A troubleshooting action may be used to provide state information about the software execution at the troubleshooting point. Troubleshooting actions include, but are not limited to, suspending execution, interrupting execution, breaking execution, stepping through execution, writing to a log file, and recording execution state. A troubleshooting action may include one or more actions. For example, a troubleshooting action may include suspending execution and recording the state of execution to a database.

In some cases, a troubleshooting operation may be referred in the vernacular of software programmers. For example, a "breakpoint," which in many cases refers to suspending execution of software at a particular line in source code, may be thought of as a troubleshooting operation, where the breakpoint includes a troubleshooting point (e.g., a particular line of source code) and a troubleshooting action (e.g., suspending execution). When the software is halted or suspended, a user (e.g., a technical support person) may analyze the current state of the software execution in an attempt to determine a cause of an error or suspicious output. Other troubleshooting or debugging processes, such as the use of monitors, watchpoints, logging, or tracing, may similarly be deconstructed into the troubleshooting point-troubleshooting action arrangement.

Consider a group of participants processing their work tasks according to a workflow managed by a workflow management system. The workflow management system supports user interface (UI) technologies, such as web forms (e.g., web browser) and rich clients. When a workflow participant initiates a workflow with a request, one or more processes may be implemented to perform activities to fulfill the workflow request. The processes may be implemented in software, hardware, or in some combination. As can happen in such programmatic implementations, there is a chance that a runtime error may occur. When a workflow incorporates activities that are executed or performed at a variety of computer systems, which may be logically or physically distributed, determining the cause of a runtime error is a complex matter.

In service-based applications, it is often not evident where and when the services are processed. Even application developers who have to analyze a problem with the processing of a particular service may be unaware of the system landscape though which a request has been propagated. One approach to diagnosing problems may be to use user-based troubleshooting or debugging. This approach attempts to identify the requesting user at each system and set breakpoints or other troubleshooting operations for a particular user having problems. However, in a load balancing environment where more than one computer is used to provide a parallel service, the application developer may not be able to predict where a particular request is processed. In addition, some conventional load balancing environments use anonymous users or generic group users in order to process requests of the same kind. When such users are implemented, the identification of the actual requestor may be lost. It is inefficient and inconvenient to consider using breakpoints or other troubleshooting operations for a generic user in a load-balanced environment, because in the case of breakpoints, it would cause every user accessing the environment to drop into a debugger.

Thus, as a different approach, when a support or developer user analyzes a problem in a service-based application, the user may first run a system-wide trace to determine which sub-systems are used in response to a particular request having problems. After doing so, the user will have an idea of which sub-systems are used in response to the request. The user may then set one or more troubleshooting operations in one or more relevant sub-systems. The troubleshooting operation may be configured to operate when a particular client is recognized. In the case of a breakpoint, when reproducing the request, a debugger is instantiated to provide debugging information when the processing of the request is at the relevant systems. Using this mechanism, the debugger is used for a particular user and a particular request encountering a problem.

Figure 1:
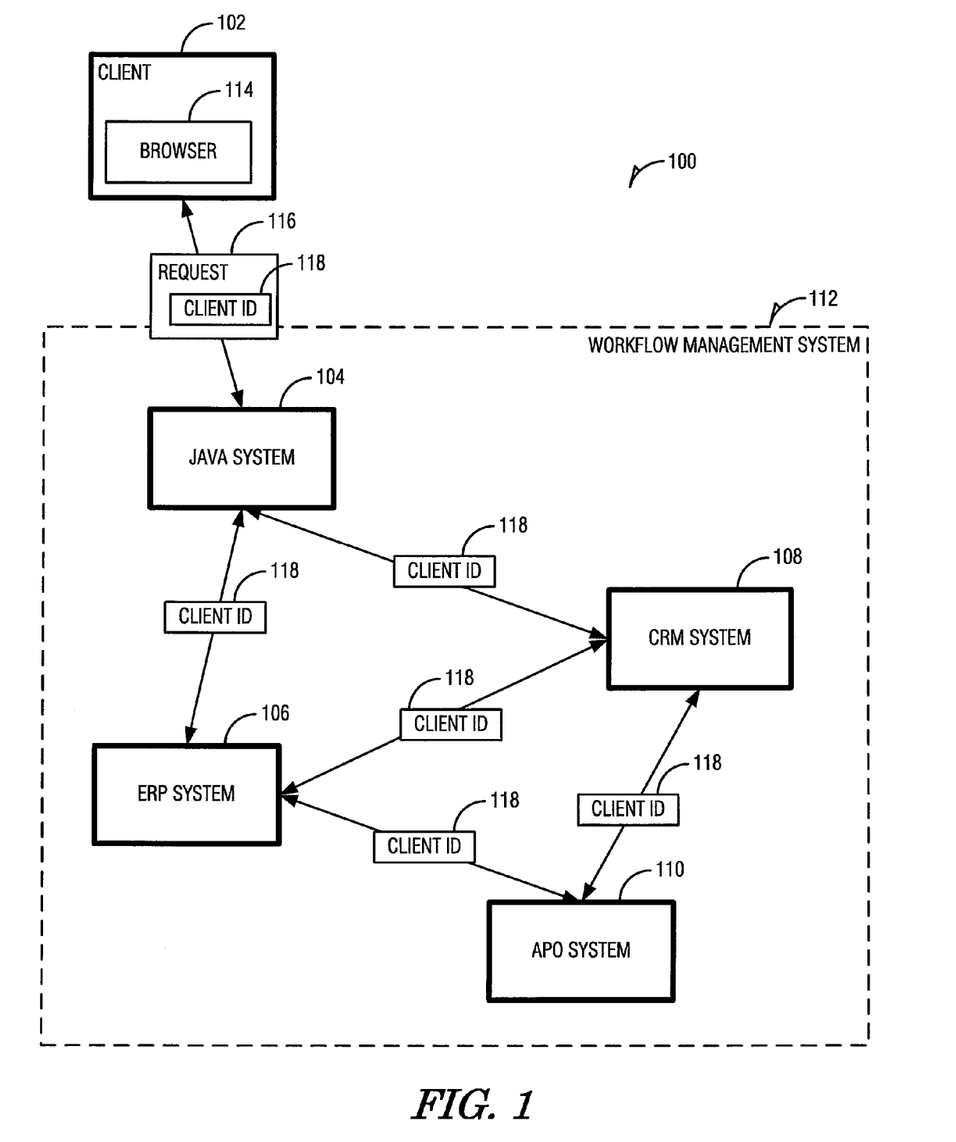
FIG. 1 is a block diagram illustrating a workflow process in a client-server environment, according to various embodiments.

FIG. 1 is a block diagram illustrating a workflow process in a client-server environment 100, according to various embodiments. The client-server environment 100 includes a client 102 and a Java system 104, an enterprise resource planning (ERP) system 106, a customer relationship management (CRM) system 108, and an advanced planner and optimizer (APO) system 110 included in a workflow management system 112.

The client 102 may be external from or internal to the workflow management system 112. For example, in a business setting, the client 102 may represent an end-user client terminal, such as a buyer or a seller. As another example, the client 102 may represent an internal client terminal, such as one used by customer support, human resources, or sales. The client 102 may interface with the workflow management system 112 via a software mechanism, such as an Internet web browser application 114. The Internet web browser application 114 may include mainstream applications such as Microsoft® Internet Explorer® provided by Microsoft Corp., Mozilla® Firefox®, and Safari® provided by Apple Inc.

The Java system 104 includes a platform-neutral interface to the workflow management system 112. The Java system 104 may be implemented using one or more web servers and one or more libraries of Java executable code (e.g., applets). The Java applets run in conjunction with a Java Runtime Environment (JRE) that executes on the client 102 either in or through the Internet web browser application 114.

When a request is received at the Java system 104 from a client 102, the Java system 104 may call out to other systems to complete the requested action. For example, should a user (not shown) at the client 102 request a billing report, a request may be generated and transmitted to the Java system 104. The Java system 104 in turn may determine that to fulfill the request, a query to the ERP system 106 is in order. After constructing an appropriate query or command, querying the ERP system 106, and receiving a response from the ERP system 106, the Java system 104 may display the results in a user-interface, such as via the Internet web browser application 114 within the client 102.

In an example embodiment, the Java system 104 includes a mechanism to parse incoming HTTP (Hypertext Transport Protocol) requests to determine which server process to direct them to. Then, additional request parsing may occur on the corresponding server process so that the appropriate module is called to process the request. The request URL for a Web application contains its application alias. The Java system 104 may parse the request and, based on the load balancing mechanism, determine which server node within a particular system (e.g., ERP system 106) to direct the request to. The server process acting on the server node may determine which application and then which module inside the application is used to process the request. For example, the module may include a servlet, a JavaServer Pages (JSP) component, or a JavaServer Faces (JSF) component, in various embodiments.

The ERP system 106 may include one or more computers (e.g., server nodes), databases, or other network devices to coordinate and manage resources, information, and activities related to business processes, such as order processing or billing management. The ERP system 106 may include a data warehouse, which may be designed as a repository of electronically-stored data and designed for efficient reporting and analysis. The ERP system 106 may also include one or more operational database systems, which perform day-to-day transaction processing.

The CRM system 108 may include one or more computers, database, or other network devices to manage business contacts, such as customers, suppliers, or partners. The CRM system 108 may include data partitioning or data organization for different parts of an organization. Various departments in an organization ranging from customer service to sales to human resources to the executive level may have to access the CRM system 108.

The APO system 110 includes one or more computers, databases, or other tools to assist a business in supply chain management. The APO system 110 may be used to determine inventory levels at various points in a supply chain, estimate manufacturing or supply, and use demand forecasts to manage inventory levels.

In example embodiments, the ERP system 106, CRM system 108, APO system 110, or other similar systems that may be included in the workflow management system 112 may be implemented as server clusters or server farms. Use of multiple server computers to provide a service may be useful in terms of redundancy or load balancing.

When a user (not shown) initiates a request 116 a client identifier 118 is included. In an example embodiment, the client identifier 118 is included in an HTTP header. The receiving Java system 104 may then extract the client identifier 118 and transmit it to other systems 106, 108, and 110 in the workflow management system 112. In an example embodiment, the Java system 104 encapsulates the client identifier 118 in a data structure that includes additional data including at least a request identifier. The data structure may be referred to as a "passport."

In an example embodiment, the client identifier 118 is a client session identifier. A client session identifier is a value that uniquely identifies a login session. For example, a user may login to several instances using a remote shell; in such a case, each login is identified by a different unique value. As another example, several different users may concurrently log in to the same machine; in this case, each user is provided a separate client session identifier. By using client session identifiers instead of an Internet Protocol (IP) address, machine access control (MAC) address, or a login name, the client session can be uniquely identified throughout the workflow management system 112.

In an example embodiment, the client identifier 118 may be stored on the client 102, such as in an operating system file, a configuration file, or an operating system database. In an example embodiment, the client identifier 118 is a globally unique identifier (GUID) stored in an operating system registry that acts as a repository of operating system parameters.

In an example embodiment, the client identifier 118 may be provided expressly. The client identifier 118 may be provided using a user-interface or with another mechanism, such as a temporary configuration file. The user-interface may be a customer support user-interface designed to allow a customer support user to indicate a particular client identifier 118 for troubleshooting purposes. With such a user-interface, a customer support person may first construct one or more troubleshooting points in one or more applications and associate the troubleshooting points with the client identifier 118. Then the customer support person may initiate the customer's request using the customer's client identifier 118 and observe the resulting output.

As a user's request is propagated through the workflow management system 112 in the natural course of generating a response, the client identifier 118 is passed from system to system. At each processing point, the client identifier 118 may be used to determine whether a troubleshooting action should be executed. For example, at the ERP system 106, a relationship between a client identifier and a troubleshooting action may be stored and related to a particular software module, software process, line of code, function call, or the like. When the particular software module, software process, line of code, function call, or other software construct is activated, used, called, or occurs, then the client identifier may be analyzed to determine whether the troubleshooting action should be executed for the client request currently being acted on. Based on the workflow associated with the request, the ERP system 106 may then pass control to the CRM system 108, which can then evaluate whether any troubleshooting actions should be triggered during the CRM system's processing. Conditional and configurable debugging operations are described with more detail with respect to FIGS. 2-6.

In an example embodiment, a relationship between the client identifier 118 and a troubleshooting operation may be stored locally at each system 104, 106, 108, and 110. In another example embodiment, a centralized database (not shown) may be used to store the relationship between the client identifier 118 and a troubleshooting operation and then one or more of the systems 104, 106, 108, and 110 may refer to the database to obtain the relationship. Using a localized storage scheme may be advantageous to reduce network traffic and increase responsiveness. However, using a centralized storage scheme may be advantageous for reduced administration and storage capacity needs.

FIG. 1 includes several business information systems as part of the workflow management system 112; however it is understood that more or fewer systems may be used.

Figure 2:
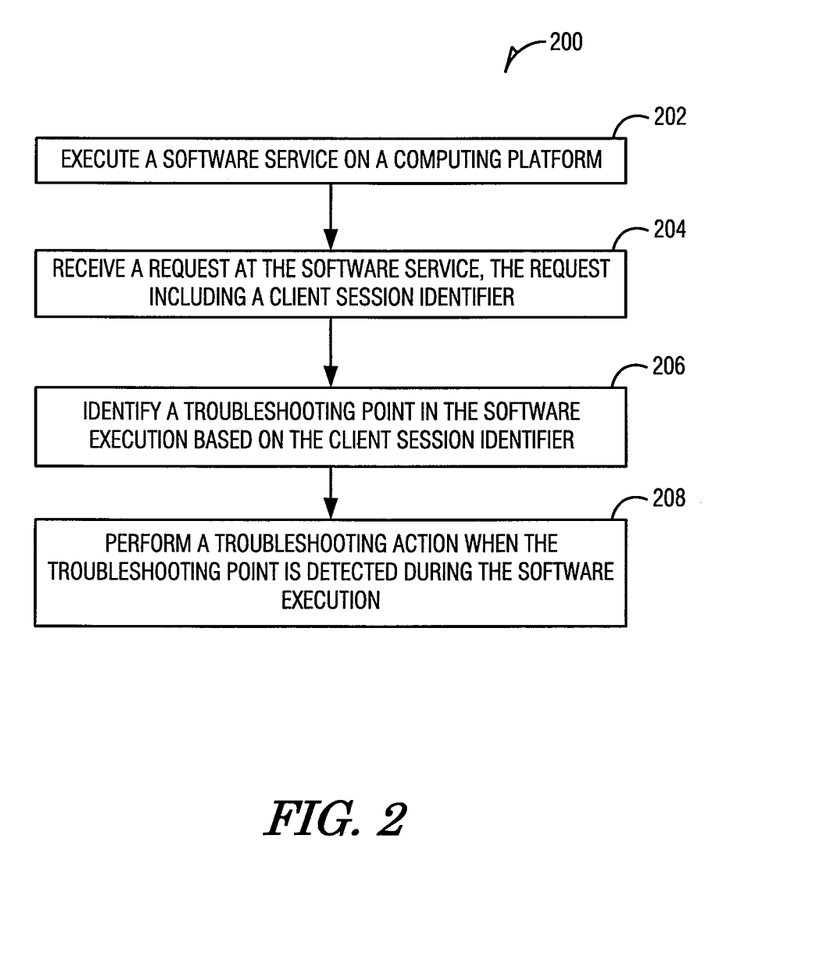
FIG. 2 is a flow chart illustrating a method for troubleshooting a software service, according to various embodiments.

FIG. 2 is a flow chart illustrating a method 200 for troubleshooting a software service, according to various embodiments. At 202, a software service on a computing platform is executed. The software service may be a compiled executable file, a script, or other programmatic constructs. In addition, the software service may refer to a software application (e.g., an accounting system or a billing database query interface) and include one or more sub-services. Alternatively, the software service may refer to a fundamental software process, such as a thread of execution within a more complex software application.

In an example embodiment, the software service is one instance of a plurality of instances. For example, in a load-balanced environment, a software service may run on several computers. Thus, in such an embodiment, each instance of the software service is executed on a separate computer of a plurality of computers, such that the plurality of instances corresponds with the plurality of computers. In another example embodiment, the software service is part of a distributed software application.

At 204, a request is received at the software service. The request includes a client session identifier. In an example embodiment, the client session identifier is a globally unique identification associated with a user login. The client session identifier may be a value that conforms to a standard, such as Microsoft's Universally Unique Identifier (UUID) standard. In an example embodiment, the client session identifier is a 16-byte number using a standardized data structure.

At 206, a troubleshooting point in the software execution is identified based on the client session identifier. The troubleshooting point may be represented as a state of a software execution, as described above. In an example embodiment, when identifying the troubleshooting point, a database describing a relationship between the client session identifier and the troubleshooting point is accessed.

At 208, a troubleshooting action is performed when the troubleshooting point is detected during the software execution. The troubleshooting action may include a breakpoint, a watchpoint, or a trace, in various example embodiments.

In an example embodiment, the troubleshooting action is configured to suspend the software execution at the point in the software execution that corresponds with the troubleshooting point.

In an example embodiment, the troubleshooting action is configured to interrupt the software execution when a data value corresponds with the troubleshooting point.

In an example embodiment, the troubleshooting action is configured to present a state of the software execution at the point in the software execution that corresponds with the troubleshooting point.

Figure 3:
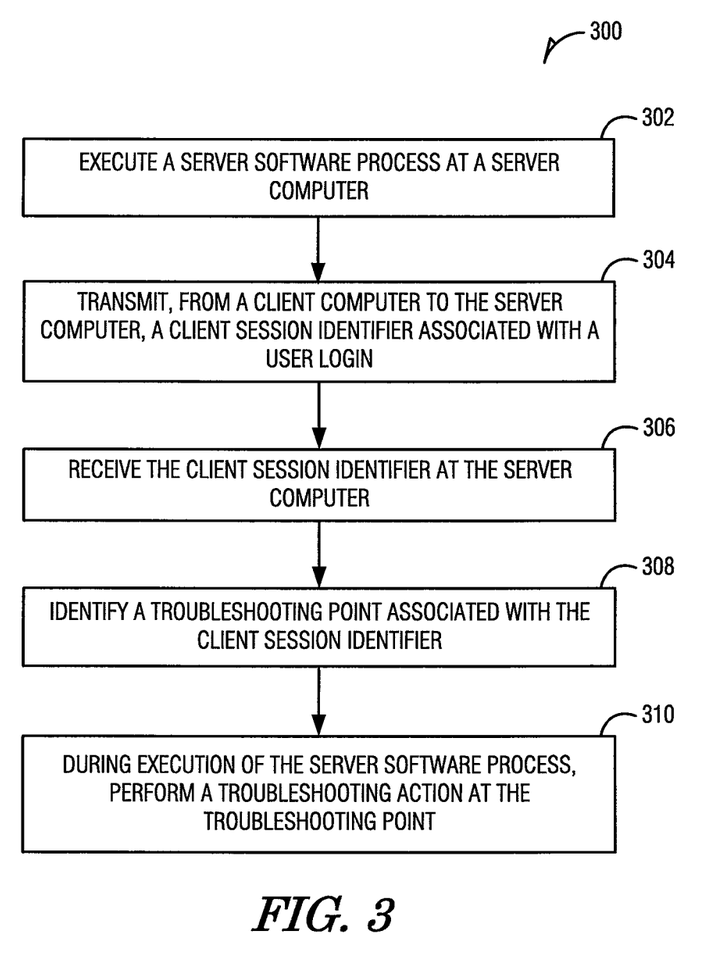
FIG. 3 is a flow chart illustrating a method for troubleshooting a server software process, according to various embodiments.

FIG. 3 is a flow chart illustrating a method 300 for troubleshooting a server software process, according to various embodiments. At 302, a server software process is executed at a server computer. The server software process includes a software application that provides a service to one or more clients that may request the service.

At 304, a client session identifier associated with a user login is transmitted from a client computer to the server computer. The client session identifier may be transmitted as part of a message from the client to the server. The message may be a request message requesting the server computer to perform a task on behalf of the client computer. An example may be a request to generate a billing report. In addition to conventional parameters that would be found in such a request, such as a request identifier, a customer account number, and a date range, the client session identifier may be passed to the server software process. In an example embodiment, the request identifier and the client session identifier are transmitted from the client computer to the server computer in a data structure. The data structure may be referred to as a "passport," in an example embodiment. The passport is an identifying data structure that authenticates the client, client session, request, or other aspects of the client-server interaction. In an example embodiment, a client process executing at the client computer is configured to communicate with the server software process, including communicating the client session identifier. In an example embodiment, the client software process includes a web browser plugin.

At 306, the client session identifier is received at the server computer. The client session identifier may be encapsulated in a data structure used to pass other relevant parameters, such as a request identifier.

At 308, a troubleshooting point associated with the client session identifier is identified. In an example embodiment, the server computer accesses a database to determine whether any troubleshooting points are associated with the client session identifier. The association between the troubleshooting points and the client session identifiers may be further restricted to a particular computer in a group of computers (e.g., one server in a load-balanced server cluster) or a particular application of a group of applications.

At 310, during execution of the server software process, a troubleshooting action is performed at the troubleshooting point. The troubleshooting action may comprise various actions, such as suspending execution, writing to a log file, or displaying the state of a program's execution. In addition, combinations of these actions may be performed as a troubleshooting action.

Figure 4:
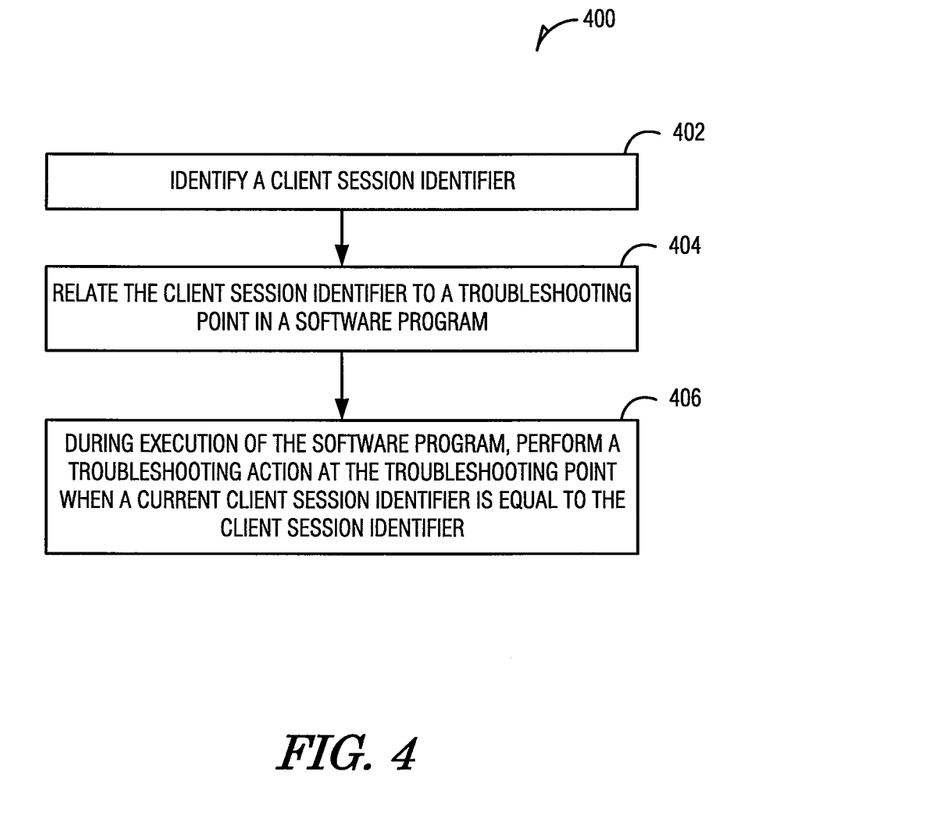
FIG. 4 is a flow chart illustrating a method for troubleshooting a software program executing on a computer, according to various embodiments.

FIG. 4 is a flow chart illustrating a method 400 for troubleshooting a software program executing on a computer, according to various embodiments. At 402, a client session identifier is identified. The client session identifier may be identified in various ways. For example, in a customer service context, a customer service agent may receive a complaint from a customer (e.g., user) regarding an error in a software service. The customer service agent may then obtain a client session identifier from the customer/user. The customer may have to access a configuration file, a system registry, or some other data repository to obtain the client session identifier and provide it to the customer service agent.

As another example, the customer service agent may have a record of the customer's client session identifier and may merely need to obtain the customer's identification to retrieve the client session identifier. As yet another example, the customer service agent may employ a software program to query the customer's computer and obtain the client session identifier. In these cases, the customer service agent may initially obtain a client session identifier and provide the identifier to the customer, such that when the customer uses the client session identifier, the client's requests may be tracked and troubleshot. In addition, the customer service agent may obtain an arbitrary client session identifier for the customer to use to initiate requests. As such, it is understood that there are many ways to identify or obtain the client session identifier.

At 404, a client session identifier is related to a troubleshooting point in a software program. In an example embodiment, the software program is identified from a plurality of software programs, where the plurality of software programs comprise different software application services. For example, referring to FIG. 1, the different software application services may be considered as referring to the ERP system 106, the CRM system 108, and the APO system 110. In another example embodiment, the software program is identified from a plurality of software programs, where the plurality of software programs comprise the same software application services. For example, in a load-balanced environment, several computers may be configured to run the same application. The software program related to the client session identifier may identify a specific instance on a particular computer in the load-balanced environment. After the software program is identified, a relationship between the client session identifier and the software program is stored in a database.

To relate the troubleshooting point to the client session identifier, in an example embodiment, a user (e.g., a support user or a developer user) may use an integrated development environment (IDE) user-interface to set one or more troubleshooting points and relate the troubleshooting points to a client session identifier. For example, a developer or other support user may first configure troubleshooting settings. An example embodiment is described with respect to FIG. 5.

Figure 5:
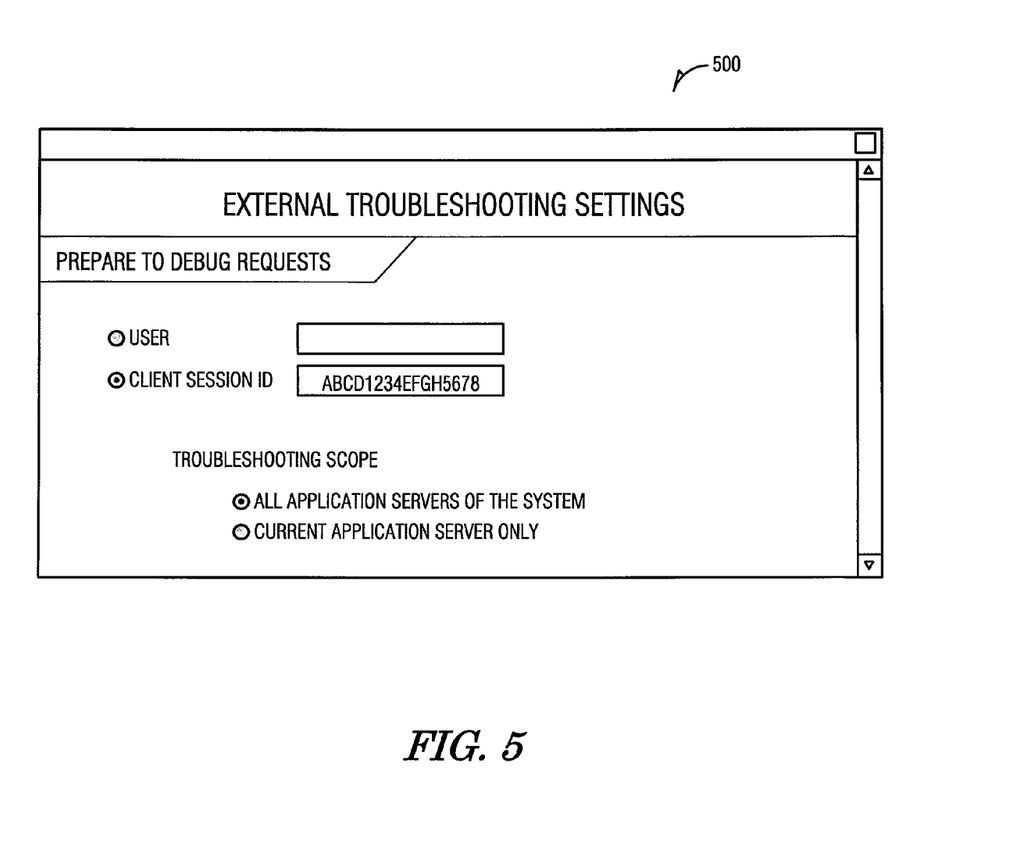
FIG. 5 is a block diagram illustrating a user interface for configuring troubleshooting settings, according to various embodiments.

FIG. 5 is a block diagram illustrating a user interface 500 for configuring troubleshooting settings, according to various embodiments. There are two primary options: User and Client Session ID. By selecting the "User" option, one can also specify a user for whom the user-based troubleshooting points should be activated. Selecting the "Client Session ID" option allows for the troubleshooting points to be request-based using the client session identifier. In addition, there are two secondary options. Selecting "All application servers of the system" activates troubleshooting points system-wide. In an example embodiment, this is the default setting. The system-wide setting is pertinent when a request is received and processed on a different application server than the one the activated troubleshooting point was set on. For example, assume that a breakpoint was set on server B, but the request is received and processed on server R, where servers B and R are both operable to perform the same functions in a load-balanced environment. In such a situation, when the system-wide option is active, a debugger window may be activated on server B controlling the request on server R. Alternatively, when the "Current application server only" option is active, only those requests received at the server the particular troubleshooting point was configured on will catch and process the corresponding troubleshooting action.

To configure troubleshooting settings for a particular client session, a developer or other support personnel may open the External Troubleshooting Settings user interface 500 while logged into a particular client session. In an example embodiment, the "Client Session ID" control field may be read-only based on the particular client session. In an example embodiment, the "Client Session ID" control field is writable so that a server may be configured to trap a client request before the client session is opened.

The field containing the client session identifier may be used as an input to indicate a particular client session identifier. For example, the value of the client session identifier control may be copied and pasted into an input field. In an example embodiment, a web browser plug-in provides an input field, where the client session identifier may be input, after which the plug-in tags outgoing web browser requests in a way that such requests include the client session identifier. In another example embodiment, a proprietary user interface may be configured using the client session identifier to tag incoming and/or outgoing requests so that any processing may be conditionally troubleshot based on the requests. In another example embodiment, a user interface element (e.g., an icon) may be used to encapsulate a tagged client session. For example, an icon may include parameters, such as a client session identifier, and be activated, such as by double-clicking the icon. The icon may be a web browser shortcut that opens a tagged client session. As another example, the icon may be used to drag-and-drop onto an existing client session user interface (e.g., a graphical user interface window) to activate the request-based troubleshooting. As another example, the icon may be a shortcut that modifies a registry setting or other computer setting that activates request-based troubleshooting for a client session on the configured computer. The icon may be transferred, transmitted, or communicated, such as via email, to other people who may then initiate a request under investigation remotely.

After configuring the troubleshooting settings, one or more troubleshooting points may be configured. For example, a developer or support personnel may access software code with an IDE and set one or more breakpoints at various lines of the software code, depending on the circumstances to be analyzed. Each troubleshooting point is then associated with the client session identifier previously set, as described with respect to FIG. 5. In another example embodiment, a user may relate a client identifier to a troubleshooting point in a software program by storing the relationship database directly. For example, a developer or support personnel may initially set one or more breakpoints in a code listing. The breakpoints may be uniquely identifiable and then with the client session identifier, the developer or support personnel may then store relationships between the client session identifier and the breakpoint identifiers. In addition, an indicium may be stored to reflect whether the breakpoints are system-wide or only for a particular server.

Returning to FIG. 4, at 406, during execution of the software program, a troubleshooting action is performed at the debug point when a current client session identifier is equal to the client session identifier. In an example embodiment, when a software program is executed in response to a request having an associated client session identifier, the software program accesses the client session identifier and queries a database having relationships between client session identifiers and troubleshooting points. If the client session identifier exists in the database with one or more relationships, the relationships are accessed to determine whether there are troubleshooting points for the particular client session identifier in the software application. If so, then the software application configures a debugger program configured with the appropriate troubleshooting points. Then when any of the troubleshooting points are encountered, the debugger program is called to perform the troubleshooting action. Using this mechanism allows the customer service agent to view the state of the software application's execution as of the troubleshooting point, thus providing additional tools for debugging and troubleshooting. Thus, for example, a customer (e.g., user) may start a request while a customer service agent waits for the debugger activation corresponding to the request, where both the troubleshooting action and the request are keyed to the client session identifier. Similarly, the customer service agent may initiate the request using the customer's client session identifier and observe, evaluate, debug, or troubleshoot the resulting output.

Figure 6:
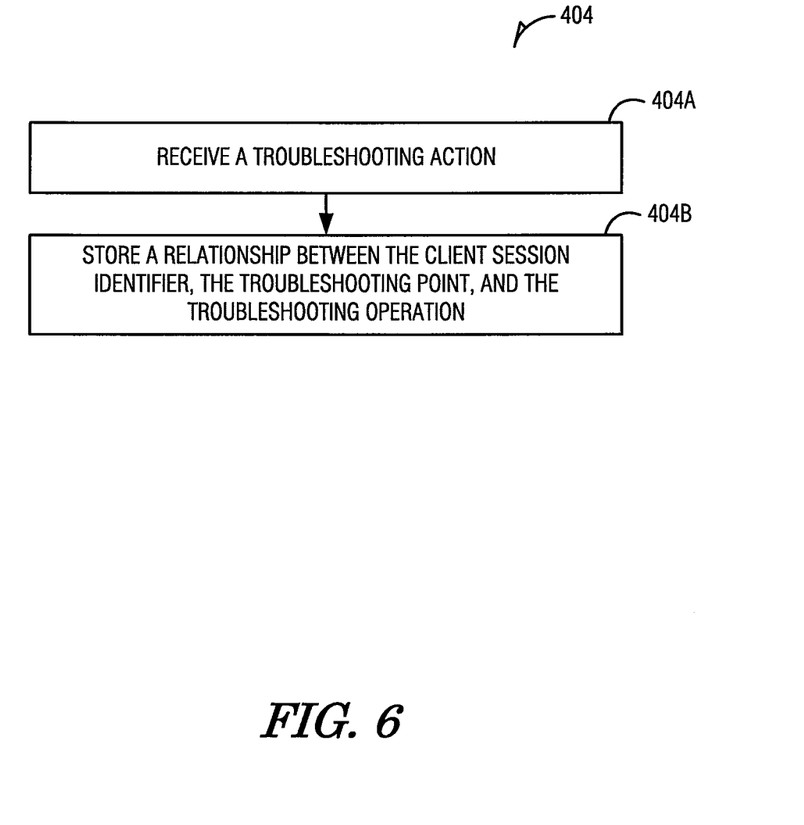
FIG. 6 is a flow chart illustrating a method for relating the client session identifier to a troubleshooting point in the software program, according to various embodiments.

FIG. 6 is a flow chart illustrating a method 404 for relating the client session identifier to a troubleshooting point in the software program, according to various embodiments. At 404A, a troubleshooting action is received.

At 404B, a relationship between the client session identifier, the troubleshooting point, and the troubleshooting action is stored. The relationship may be stored using one or more tables in a database. In an example embodiment, a relationship between a client session identifier and a troubleshooting operation is stored, where the troubleshooting operation is referred to as a separate object that includes both the troubleshooting point and related troubleshooting action. The database may be a relational database. As described above, the database may be dispersed among several subsystems within the workflow management system 112 (FIG. 1), either as a replicated database or a distributed database, or the database may be centrally located with each subsystem properly configured to access the database when determining relationships between client session identifiers and troubleshooting points. In addition, a combination of dispersed databases and centrally located databases may be used. This hybrid database topology may be advantageous, for example, when some subsystems (e.g., 104, 106, 108, 110 of FIG. 1) are geographically dispersed.

In an example embodiment, troubleshooting actions or troubleshooting operations may be assigned a lifespan, such that after a certain period, the troubleshooting action or operation is removed from the database. In an example embodiment, the troubleshooting operations may be associated with one or more servers in a load-balanced environment. For example, by associating the troubleshooting operation with one server in the load-balanced environment, the support user may be able to test whether the particular server is having specific problem with a particular request or user. In contrast, by associating the troubleshooting action or operation with all servers for a particular software application, the user's request will trigger the troubleshooting action regardless of which server actually handles the request.

Figure 7:
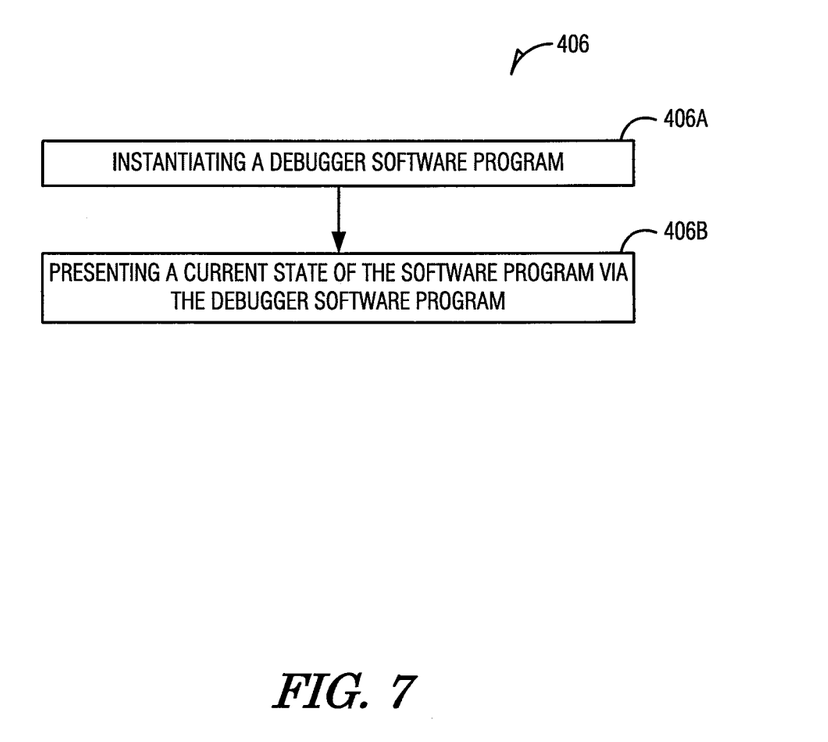
FIG. 7 is a flow chart illustrating a method for performing a troubleshooting operation, according to various embodiments.

FIG. 7 is a flow chart illustrating a method 406 for performing a troubleshooting action, according to various embodiments. At 406A, a debugger software program is instantiated. In an example embodiment, the debugger software program is instantiated at a location remote from the location where the software program is being executed. For example, a debugger program may be used at a customer service user's computer to debug a software application running at a remote server. The remote server may be in a different room or even in a different country from the customer service user.

At 406B, a current state of the software program is presented via the debugger software program. The current state may be represented using one or more values. The values may represent variables used in the software program, parameter values, or other environmental or contextual values, such as memory usage, processor load, or network state.

Figure 8:
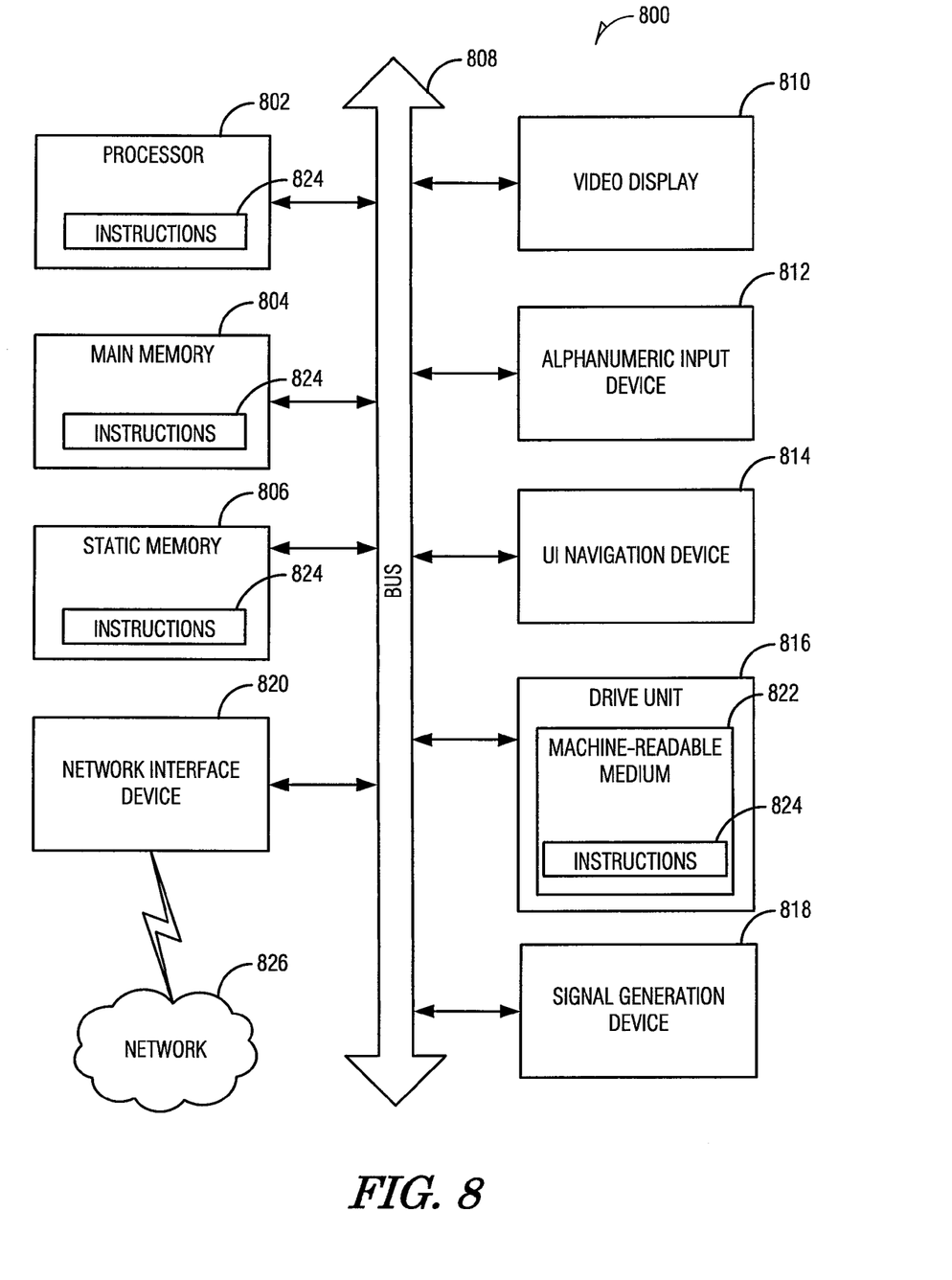
FIG. 8 is a block diagram illustrating a machine in the example form of a computer system, within which a set or sequence of instructions for causing the machine to perform any one of the methodologies discussed herein may be executed, according to various embodiments.

FIG. 8 is a block diagram illustrating a machine in the example form of a computer system 800, within which a set or sequence of instructions for causing the machine to perform any one of the methodologies discussed herein may be executed, according to various embodiments. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium," also referred to as a "computer-readable medium," shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media.

Thus, a method and system to debug a software application have been described. Although the present description has been described with reference to specific example embodiments, it will be evident that various modifications and changes may be made to these embodiments without departing from the broader scope of the description. Various combinations and permutations of these embodiments are considered to be within the scope of the description. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A computer-implemented method for r b shooting a software service, the method comprising:
    executing the software service on a computing platform to provide a software execution;
    receiving a request at the software service, the request including a client session identifier uniquely identifying a user login session, the software execution processing the request;
    identifying a troubleshooting point in the software execution based on the client session identifier, the identifying including accessing a database that describes a relationship between the client session identifier and the troubleshooting point; and
performing a troubleshooting action on the software execution when the troubleshooting point is detected during the software execution processing the request.

2. The method of claim 1, wherein the software service is one instance of a plurality of instances, each instance of the plurality of instances being executed on a corresponding computer of a plurality of computers.

3. The method of claim 1, wherein the client session identifier is a globally unique identification associated with a user logon.

4. The method of claim 1, wherein the troubleshooting action comprises suspending execution of the software execution at a point in the software execution that corresponds with the troubleshooting point.

5. The method of claim 1, wherein the troubleshooting action comprises interrupting the software execution when a data value corresponds with the troubleshooting point.

6. The method of claim 1, wherein the troubleshooting action comprises presenting a state of the software execution at the point in the software execution that corresponds with the troubleshooting point.

7. A system for troubleshooting a software service, the system comprising:
a memory to store data describing a relationship between a client session identifier and a troubleshooting point; and
a processor configured to:
execute the software service on a computing platform to provide a software execution;
receive a request at the software service, the request including the client session identifier;
identify the troubleshooting point in the software execution based on the client session identifier, the identifying including accessing the data describing a relationship between the client session identifier and the troubleshooting point; and
perform a troubleshooting action when the troubleshooting point is detected during the software execution.

8. The system of claim 7, wherein the software service is one instance of a plurality of instances, each instance of the plurality of instances being executed on a corresponding computer of a plurality of computers.

9. The system of claim 7, wherein the client session identifier is a globally unique identification associated with a user logon.

10. The system of claim 7, wherein the troubleshooting action comprises suspending the software execution at a point in the software execution that corresponds with the troubleshooting point.

11. The system of claim 7, wherein the troubleshooting action comprises interrupting the software execution when a data value corresponds with the troubleshooting point.

12. A system comprising:
a client computer; and
a server computer, the server computer executing a server software process,
wherein the client computer is configured to transmit, to the server computer, a client session identifier associated with a user login and a request to the server software process, and
wherein the server computer is configured to:
receive the client session identifier,
identify a troubleshooting point associated with the client session identifier, the identifying including accessing a database that describes a relationship between the client session identifier and the troubleshooting point, and
during execution of the server software process, perform a troubleshooting action on the server software process at the troubleshooting point.

13. The system of claim 12, wherein the client computer comprises a client software process configured to communicate with the server software process.

14. The system of claim 13, wherein the client software process comprises a web browser plugin.

15. A method for troubleshooting a software program executing on a computer, the method comprising:
identifying a client session identifier;
relating the client session identifier to a troubleshooting point in the software program, the relating including identifying the software program from a plurality of software programs, wherein the plurality of software programs comprise different software application services;
storing a relationship between the client session identifier and the software program in a database; and
during execution of the software program, performing a troubleshooting action on the execution of the software program at the troubleshooting point when a current client session identifier is equal to the client session identifier, the current client session identifier associated with a request to the execution of the software program.

16. The method of claim 15, wherein identifying the client session identifier further comprises receiving the client session identifier via a user interface control.

17. The method of claim 15, wherein performing the troubleshooting action further comprises:
instantiating a debugger software program; and
presenting a current state of the software program via the debugger software program.

18. The method of claim 17, wherein instantiating the debugger software program is performed at a location remote from a location where the software program is executed.

19. A method for troubleshooting a software program executing on a computer, the method comprising:
identifying a client session identifier;
relating the client session identifier to a troubleshooting point in the software program,
during execution of the software program, performing a troubleshooting action on the execution of the software program at the troubleshooting point when a current client session identifier is equal to the client session identifier, the current client session identifier associated with a request to the execution of the software program;
receiving the troubleshooting action; and
storing a relationship between the client session identifier, the troubleshooting point, and the troubleshooting action in a database.

20. A method for troubleshooting software programs executing at a service provider, the service provider comprising a first server system and a second server system, the method comprising:
receiving a client session identifier at the first server system in association with a request to the service provider;
determining whether a first troubleshooting operation related to the client session identifier is activated at the first server system, the determining including accessing a database that describes a relationship between the client session identifier and the first troubleshooting operation;

initiating the first troubleshooting operation at the first server system in response to determining that there is an active first troubleshooting operation related to the client session identifier;

transmitting the client session identifier to the second server system;

determining whether a second troubleshooting operation related to the client session identifier is activated at the second server system. the determining including accessing a database that describes a relationship between the client session identifier and the second troubleshooting operation; and initiating the second troubleshooting operation at the second server system in response to determining that there is an active second troubleshooting operation related to the client session identifier.

* * * * *